United States Patent
Costa et al.

(10) Patent No.: US 6,374,637 B1
(45) Date of Patent: Apr. 23, 2002

(54) PROCESS FOR PRODUCING A LINEARLY-MINIATURIZED DENSIFIED OPTICAL ARTICLE USING A MOLD HAVING AN INTERNAL VOLUME WHICH IS A HOMOTHETIC COPY OF THE OPTICAL ARTICLE

(75) Inventors: Lorenzo Costa, Sommo Lomellina; Paolo Chiurlo, Milan, both of (IT)

(73) Assignee: Enichem S.p.A., Milan (IT)

(*) Notice: Subject to any disclaimer, the term of this patent is extended or adjusted under 35 U.S.C. 154(b) by 0 days.

(21) Appl. No.: 09/651,109

(22) Filed: Aug. 30, 2000

Related U.S. Application Data

(63) Continuation of application No. 08/533,551, filed on Sep. 25, 1995.

(30) Foreign Application Priority Data

Oct. 6, 1994 (IT) .......................................... 002035-94/A

(51) Int. Cl.$^7$ ................................................ C03B 8/02
(52) U.S. Cl. ................................................ 65/17.2; 423/338
(58) Field of Search ........................ 65/17.2, 395, 440; 423/338

(56) References Cited

U.S. PATENT DOCUMENTS

| | | | | |
|---|---|---|---|---|
| 4,432,956 A | * | 2/1984 | Zarzycki et al. | 423/338 |
| 4,680,049 A | * | 7/1987 | Onorato et al. | 65/395 |
| 5,076,980 A | * | 12/1991 | Nogues et al. | 264/621 |
| 5,207,814 A | * | 5/1993 | Cogliati et al. | 65/396 |

FOREIGN PATENT DOCUMENTS

| | | | |
|---|---|---|---|
| EP | 586 013 | * | 3/1994 |
| JP | 2-120246 | * | 5/1990 |
| WO | 93/21120 | * | 10/1993 |

\* cited by examiner

*Primary Examiner*—Sean Vincent
(74) *Attorney, Agent, or Firm*—Oblon, Spivak, McClelland, Maier & Neustadt, P.C.

(57) ABSTRACT

A process for producing a linearly-miniaturized, densified optical product, which entails a) cold filling a mould with a liquid colloidal dispersion formed from a chemical precursor; b) polycondensing the liquid colloidal dispersion to obtain a gel; c) supercritically drying the gel to form an amorphous aerogel having dimensions corresponding to the mould; and d) isotropically miniaturizing the amorphous monolithic aerogel obtained.

16 Claims, 2 Drawing Sheets

PROCESS FOR PRODUCING A LINEARLY-MINIATURIZED DENSIFIED OPTICAL ARTICLE USING A MOLD HAVING AN INTERNAL VOLUME WHICH IS A HOMOTHETIC COPY OF THE OPTICAL ARTICLE

This application is a Continuation of application Ser. No. 08/533,551 Filed on Sep. 25,1995.

The present invention relates to optical components in silicon oxide and/or other mixed metallic oxides having dimensional precision which has surface roughness tolerance and profilometric accuracy within the specifications described for visible and ultraviolet spectrum ranges.

The above manufactured articles have "final" or "almost final" dimensions as they are obtained by the isotropic dimensional reduction (miniaturization) of amorphous monolithic materials, called aerogels, in turn prepared by means of cold moulding techniques based on sol-gel processes.

The process for the preparation of the above objects involves the accurate geometrical definition of the aerogel by:
- the cold filling of a suitable mould with a liquid colloidal dispersion, called sol, formed from specific chemical precursors;
- the polycondensation of the sol to obtain the respective gels therefrom (gelation);
- the supercritical drying of the gels until aerogels are obtained with dimensions corresponding to the mould used;
- the isotropic reduction (miniaturization) of the amorphous monolithic aerogels thus obtained, consisting of silicon oxide alone or in the presence of one or more oxides of elements belonging to groups III° to VI° of the Periodical Table and exceptionally also other groups.

It is known that optical materials, and in particular transparent optical materials such as silica or molten quartz and optical glass, owing to their hardness and fragility, are difficult to process as the direct hot moulding of these optical components and devices is generally not possible for reasons of product quality.

The traditional method for producing these optical elements is based on the reduction of an adequate preform to the end product by means of slow, precise grinding operations.

Whereas some of these operations, such as reduction with both a flat and spherical surface, can be automized, others, such as aspherical finishing, require complicated manual processes.

This operational difficulty results in a limited process flexibility on an industrial scale and unreasonably high costs to obtain quality products such as optical components and devices based on the above aspherical optical system.

Owing to these technological limitations the optical industry has tried to solve the problem in various ways.

One of these is the moulding at high pressure and temperature of aspherical lenses and other optical components, directly from appropriate preforms of the optical material desired; with this method, which requires extremely sophisticated equipment such as a hot hydrostatic press, high quality products are obtained but also at a high cost and the process consequently necessitates very substantial investments.

One way of reducing the costs is by the use of organic optical materials, in particular plastics.

These materials can be melted and moulded with much more economical processes and can also be very easily processed with machine tools.

Unfortunately the dimensional precision of the optical products obtained generally by melting, is negatively influenced both by the insufficiently controllable shrinking of the material during the cooling operation and by the change of liquid-solid phase which causes a dimensional distorsion and deterioration of the optical quality of the manufactured article.

Also with the use of mechanical processing with machine tools, the optical products obtained from plastic materials do not have an acceptable quality as the material cannot be accurately processes owing to the fact that it is too soft.

In addition, the products which can be obtained with the above plastic materials, by hot moulding or mechanical processing, suffer from limited chemical and dimensional stability and do not reach the durability standards established for inorganic optical materials.

It is also known that optical components with definite dimensions can be obtained by suitably treating a gel deriving from the hydrolysis of a silicon alkoxide.

For example, U.S. Pat. No. 4,680,049 describes a method for the preparation of optical glass based on silicon oxide which involves an initial hydrolysis of a silicon alkoxide, the drying of the above gel and a final thermal syntherization treatment until an optical glass with definite dimensions is obtained.

These "final" optical products however have a very significant deviation with respect to the profile of the aerogel, as is amply illustrated in FIG. 1.

The two diagrams shown in the above figure represent the configuration of the upper surface of the aerogel (diagram A) and the corresponding surface of the densified product (diagram B) respectively.

In the mould in which the gel is prepared the corresponding surface is rigorously flat: it can be seen how the flat surface of the mould passes to a convex surface in the aerogel to end up as a concave surface in the densified product.

The distorsion of the manufactured article is herein quantified as follows:

$$\text{distorsion from mould to aerogel} = \frac{20 \ \mu m}{3000 \ \mu m} \times 100 = 0.67\%$$

$$\text{distorsion from aerogel to glass} = \frac{40 \ \mu m}{2000 \ \mu m} \times 100 = 2\%$$

This process, which herein is simply indicated as "compensated distorsion process", is severely limited in its industrial applications as there are difficulties in programming specific geometries of the product.

In fact, as there is no biunivocal, continuous correspondence between the geometry of the mould and that of the product, there is also no rational control of the final dimensions of the product itself.

Another attempt at developing the processing technology of optical materials has been made using machine tools with a very high precision numerical control, having a diamond point so as to be also able to process hard materials such as quartz and optical glass and with movement on air bearings to minimize the vibrations of the tool point.

These machines have been successfully developed in the last ten years and reach precision in the profile control of about a tenth of a micrometer and, under favourable conditions, even higher precision in the control of the surface roughness; they are consequently capable of finishing an item with so-called "optical" precision, which means a precision which is suitable for optics limited within the infrared spectrum range.

On the other hand, the above machines are still not adequate for applications in visible and ultraviolet spectrum ranges owing to the more severe specifications of surface roughness and profilometric accuracy required by optical laws within these spectrum ranges.

In addition, this high precision processing, which although economically convenient in special applications such as mirror finishing by laser in copper, aluminium or other materials typically used in infrared, is not generally economical for obtaining transparent optical components based on silica or inorganic glass, for numerous reasons including the hardness and fragility of the materials.

It is known in fact that these machines can be well used in the processing of typical materials for applications in infrared; this is due to their processability characteristics which are much higher than optical glass.

This creates great difficulties in the spectrum ranges, where glass is the prevalent material for which the technology of the single rotating diamond point (S.P.T.D.M.) cannot be used because of its fragility.

As described in Italian patent application MI-92A02038 filed by the Applicant, these high precision machine tools are used on intermediates to obtain perfectly and completely isotropic optical components and devices in "final" or "almost final" dimensions; the above intermediates, as they have the property of isotropically shrinking, are monolithic aerogels ideally amorphous of silica and/or other metallic oxides produced according to the technology described in U.S. Pat. No. 5,207,814.

SUMMARY OF THE INVENTION

The Applicant has now found that gels prepared with the technology of U.S. Pat. No. 5,207,814, in suitable moulds, in accordance with what is described in Italian patent application MI92A02038 which can be referred to for any possible point of interest, can be linearly miniaturized into densified products which maintain the proportions of the mould with a precision greater than one part out of 10,000.

DETAILED DESCRIPTION OF THE PREFERRED EMBODIMENT

Figure 1B:
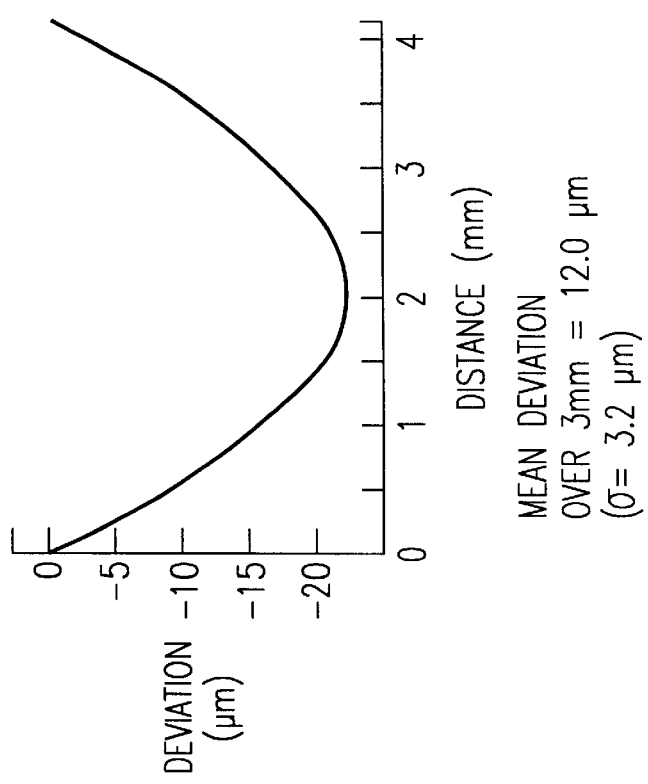
FIG. 1A and FIG. 1B illustrate the configuration of the upper surface of the aerogel, and the corresponding surface of the densified product, respectively, of U.S. Pat. No. 4,680,049.
Figure 1A:
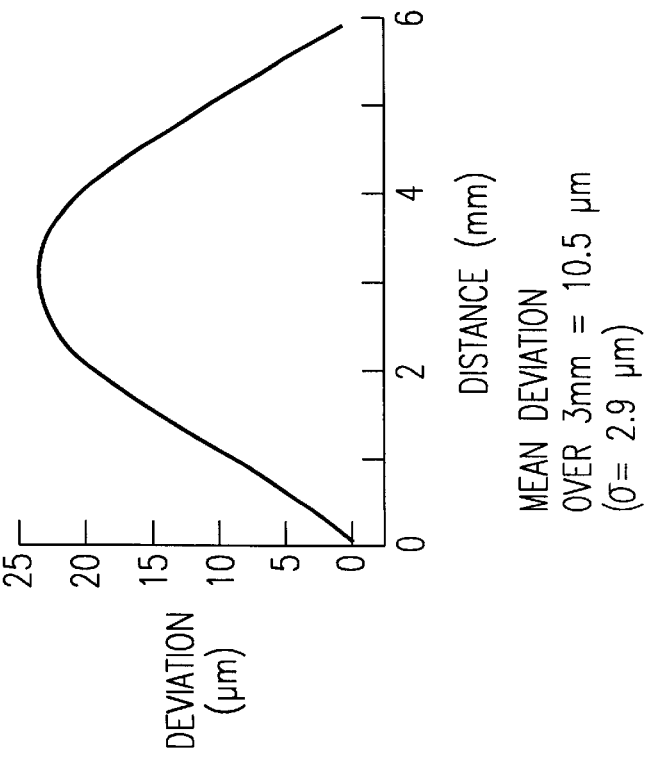

In particular, therefore, the invention relates to the preparation of the above products, according to a process which involves the accurate geometrical definition of the aerogel by:

the cold filling of a suitable mould with a liquid colloidal dispersion, called sol, formed from specific chemical precursors;

the polycondensation of the sol to obtain gels (gelation);

the supercritical drying of the gels until aerogels are obtained with dimensions corresponding to the mould used;

the isotropic reduction (miniaturization) of the amorphous monolithic aerogels thus obtained, consisting of silicon oxide alone or in the presence of one or more oxides of elements belonging to the III° to VI° Group of the Periodical Table and exceptionally also other groups.

These cold moulding techniques are based on the use of special specifically prepared moulds.

These moulds, having much greater dimensions than the manufactured article, have an internal volume which is defined as a "homothetic copy" of the "end"-product itself, which is characterized in terms of profilometric accuracy, surface roughness and scaling ratio with the product itself.

The product thus obtained has "almost final" dimensions i.e. it requires only an optical polishing with the conventional methods or, at the best, it has "final" dimensions i.e. it does not require any conventional optical processing.

The overall result of the present invention is therefore the economical production of optical components and devices made of silica glass or other optical glass using a new cold moulding technique based on specific sol-gel synthesis processes.

The present invention consequently relates to optical articles, components or devices, with "final" or "almost final" dimensions and completely isotropic, consisting of silicon oxide, either alone or in the presence of one or more oxides belonging to groups III° to VI° of the Periodic Table, and exceptionally also other groups, said optical articles, components or devices having dimensional precision which has tolerance to surface roughness and profilometric accuracy required for the visible and ultraviolet spectrum ranges, characterized in that said tolerance being between ½ and 1/10 wave length corresponding to the range 0.350–0.02 micrometers and, preferably, equal to ¼ wave length corresponding on an average, in the visible range, to 0.275 micrometers.

The above and other operating details will be explained in the following illustrative examples which however do not restrict the scope of the present invention.

EXAMPLE 1

PREPARATION OF PREFORMS OF PURE SILICA

An example is given of the preparation of silica glass disks, with a diameter of 2.5 cm and height of 1.0 cm, as preforms for optical lenses.

For this purpose, 80 ml of HCl 0.01N are added, under vigorous stirring, to 100 ml (0.44 moles) of tetraethylorthosilicate (TEOS) (molar ratio $TEOS:H_2O:HCl=1:10:1.8\times10^{-4}$).

After about 60 minutes a limpid solution is obtained and 52.8 g of colloidal silica powder (Aerosil OX50—Degussa) prepared from silicon tetrachloride by oxidation at high temperatures, is added, still under vigorous stirring, to this solution.

The mixture obtained is homogenized using ultrasounds for a duration of about ten minutes and then clarified by centrifugation.

The homogeneous dispersion obtained is poured into cylindrical containers of polyester with a diameter of 5.0 cm and height of 2.0 cm, which are hermetically closed, placed in an oven and maintained at 50° C. for 12 hours.

The gel which is obtained is suitably washed with ethanol and subsequently supercritically dried in an autoclave at a temperature of 300° C. or in any case higher than the critical temperature of the solvent.

An aerogel is obtained which is calcinated at a temperature of 800° C. in an oxidizing atmosphere.

During the heating, the residual organic products coming from the treatment in the autoclave are burnt.

The dimensions of the aerogel obtained are those of the internal volume of the initial cylindrical container.

The disk of silica aerogel, after calcination, is subjected to a stream of helium containing 2% of chlorine, at a temperature of 800° C. and for a duration of 30 minutes to remove the silanolic groups present; the aerogel disk is finally heated in a helium atmosphere to a temperature of 1400° C. for the duration of one hour so that the silica reaches complete densification and consequent miniaturization.

After cooling, the disk reaches the desired final dimensions (diameter 2.5 cm and height 1.0 cm), maintaining a homothetic ratio with the form of the initial aerogel determined by the initial mould.

The densified material has the same physicochemical characteristics as the silica glass obtained by melting (density=2.20; refraction index (at 587.56 nm)=1.4585; Abbe dispersion=67.6).

EXAMPLE 2

DUPLICATION OF OPTICAL SURFACES

Moulds are prepared with an internal surface finished with optical specifications (surface roughness less than ⅕ with a wave length corresponding to less than 0.08 micrometers).

The internal volume of the moulds corresponds to a cylinder of 5.0 cm in diameter and 2.0 cm in height.

One of the bases of the cylinder consists of the optical surface to be duplicated.

A colloidal solution prepared by adding to the homogeneous solution, obtained as in example 1, a solution of ammonium hydroxide 0.1N, dropwise under stirring, until a pH of about 4–5 is reached, is poured into the moulds.

The moulds thus filled, are hermetically closed, placed in an oven and maintained at 20° C. for 12 hours.

The production of the gel and subsequent supercritical drying are carried out according to the procedure described in example 1.

The profilometric and surface roughness results, measured on the optical surface of the aerogel, have the same optical quality as the original surface with a roughness of less than 0.1 micrometres, corresponding to ⅕ average wave length of the visible spectrum range.

EXAMPLE 3

ASPHERICAL LENSES

A mould has been designed for providing a preform for a flat/convex lens of which the convex surface corresponds to an aspherical surface defined by the general equation:

$$X = \frac{cy^2}{1 + \sqrt{1 - (K+1)c^2 y^2}} + Dy^4 + Ey^6 + Fy^8 + Gy^{10}$$

wherein the y axis of the equation corresponds to the optical axis of the lens.

The constants for the densified product, having a diameter of 15 mm±0.05 and height of 6.25 mm±0.10, are the following:

C=0.17364596
K=−1.000000
D=−0.000071
E=0.000022
F=−6.62323E$^{-7}$
G=7.03174E$^{-9}$

To obtain the specific dimensions of the densified product, a miniaturization factor was programmed equal to 2, which is equivalent to an internal mould volume with double dimensions with respect to the manufactured article desired.

The transformations for the new constants are:
C'=C/R
K'=K
D'=D/R$^3$
E'=E/R$^5$
F'=F/R$^7$
G'=G/R$^8$ The appropriate mould was prepared with machine tools having numerical control.

No optical finishing treatment was carried out on the surface of the mould, the objective of the experiment being the average profile of the aspherical lens rather than the optical finishing of the surface.

A silicic sol was prepared with the procedure of example 2.

A series of 3 aerogels was prepared using the above mould according to the procedures described in example 2.

The aerogels were subjected to profilometric analysis as follows: each aerogel was placed in line at the centre of a Mitutoyo series 332 profile projector and compared to the theoretical profile corresponding to the equation of the aspherical profile.

The comparison was carried out by direct placement over the screen.

To increase the sensitivity of the method, each analysis was carried out with photographic aid and subsequent projection on a huge screen providing a sensitivity of up to a ten thousandth of the dimension of the object.

The aerogels were then densified (miniaturized), with the thermal treatment described in example 1 and compared with the respective theoretical profile as in the case of the aerogels.

In both the aerogels and the densified products, the maximum deviation, relating to the respective theoretical profiles is less than 0.002 mm, a value which is considered as the limit of the sensitivity of the method.

Figure 2:
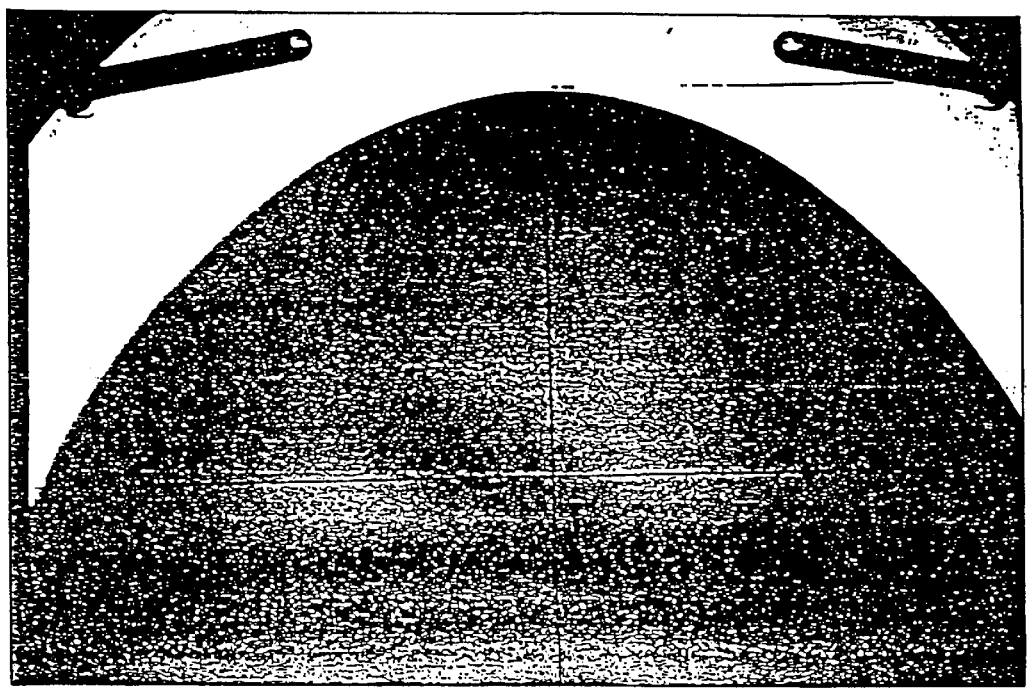
FIG. 2 illustrates an example of a profilometric determination of the present invention showing that the aspherical profile of the aerogel is comparable to the theoretical profile.

An example of profilometric determination is shown in FIG. 2 wherein the aspherical profile of the aerogel is comparable to the theoretical profile generated by the equation (see the dark external line) and the site of the theoretical profile points has been slightly moved towards the outside to facilitate observation of the trend parallel to the surface.

In addition to the profilometric analysis, the dimensional reproducibility was verified, by micrometry, on the main diameters (flat surface) of the densified products.

The results are summarized in Table 1 below:

TABLE 1

| SAMPLE | AVERAGE DIAMETER (mm) | STAND. DEVIATION |
|---|---|---|
| A 34/44-1 | 15.3775 | 0.003 |
| A 34/26 | 15.3725 | 0.002 |
| A 34/28 | 15.3780 | 0.003 |

What is claimed is:

1. A process for producing a linearly-miniaturized densified optical article, which comprises the steps of:

a) cold filling a mold, with an internal volume which is a homothetic copy of the linearly-miniaturized densified optical article produced, with a liquid colloidal dispersion formed from a chemical precursor of the optical article to be produced;

b) polycondensing the liquid colloidal dispersion to obtain a gel;

c) supercritically drying the gel until an amorphous aerogel is obtained having dimensions corresponding to the mold; and d) isotropically miniaturizing the amorphous aerogel obtained;

wherein the linearly-miniaturized densified optical article maintains proportions of the mold to a precision of greater than 1 part out of 10,000; and further wherein the linearly-miniaturized densified optical article produced has a tolerance to surface roughness and profilometric accuracy required for visible and ultraviolet spectrum ranges, wherein the tolerance is between one-half and one-tenth wavelength corresponding to the range of 0.350–0.02 μm.

2. The process of claim 1, wherein the linearly-miniaturized densified optical article consists essentially of silicon oxide or silicon oxide in combination with one or more oxides of elements belonging to Group III to VI of the Periodic Table.

3. The process of claim 1, wherein the tolerance is one-quarter wavelength corresponding on average, in the visible range, to 0.275 μm.

4. The process of claim 1, wherein the mold is made of polyester.

5. The process of claim 1, wherein the liquid colloidal dispersion is polycondensed in step b) at 50° C. for 12 hours.

6. The process of claim 1, wherein the formed gel is supercritically dried in step c) at a temperature higher than the critical temperature of the solvent used.

7. The process of claim 6, wherein the temperature of supercritical drying is 300° C.

8. The process of claim 1, wherein in step d) the aerogel formed in step c) is calcinated at 800° C. in an oxidizing atmosphere.

9. The process of claim 8, which further comprises after calcination, subjecting the calcined aerogel to a stream of helium containing chlorine at a temperature and for a time sufficient to remove silanolic groups.

10. The process of claim 9, which further comprises after removing said silanolic groups, heating the aerogel in a helium atmosphere at a temperature and for a time sufficient to reach complete densification and consequent miniaturization.

11. The process of claim 10, wherein the aerogel is heated at 1400° C. for one hour.

12. The process of claim 1, wherein the linearly-miniaturized densified optical product is a silica glass disk.

13. The process of claim 1, wherein the linearly-miniaturized densified optical product is a preform for a flat/convex lens.

14. The process of claim 1, wherein both the aerogel formed in step c) and the densified product formed in step d), a maximum deviation relative to a theoretical profile is less than 0.002 mm.

15. The process of claim 1, which further comprises after step a), and before step b), hermetically closing said mold.

16. The process of claim 1, wherein the tolerance of the linearly-miniaturized densified optical article produced is less than 0.1 μm, corresponding to ⅕ average wavelength of the visible spectrum range.

* * * * *